US012771390B2

(12) United States Patent
Köse

(10) Patent No.: US 12,771,390 B2
(45) Date of Patent: Oct. 20, 2026

(54) ADJACENT-CHANNEL INTERFERENCE CHARACTERIZATION FOR IN-BAND INTERFERENCE EXCISION IN WIRELESS COMMUNICATION SYSTEMS

(71) Applicant: TrellisWare Technologies, Inc., San Diego, CA (US)

(72) Inventor: Cenk Köse, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 238 days.

(21) Appl. No.: 18/834,289

(22) PCT Filed: Feb. 1, 2023

(86) PCT No.: PCT/US2023/012138
§ 371 (c)(1),
(2) Date: Jul. 30, 2024

(87) PCT Pub. No.: WO2023/150180
PCT Pub. Date: Aug. 10, 2023

(65) Prior Publication Data

US 2025/0112657 A1 Apr. 3, 2025

Related U.S. Application Data

(60) Provisional application No. 63/305,472, filed on Feb. 1, 2022.

(51) Int. Cl.
*H04B 1/00* (2006.01)
*H04B 1/12* (2006.01)

(52) U.S. Cl.
CPC .................................... *H04B 1/12* (2013.01)

(58) Field of Classification Search
CPC .................... H04B 1/10; H04B 1/1027; H04B 2001/1045; H04B 1/1081; H04B 1/109; H04B 1/12; H04B 1/7097; H04B 1/711; H04B 2001/7152; H04B 1/71637
See application file for complete search history.

(56) References Cited

U.S. PATENT DOCUMENTS

| | | | | |
|---|---|---|---|---|
| 10,153,924 B2* | 12/2018 | Kim | ......................... | H04B 3/32 |
| 12,123,966 B2* | 10/2024 | Wu | ......................... | G01S 7/023 |
| 2011/0222638 A1 | 9/2011 | Park et al. | | |
| 2016/0365914 A1* | 12/2016 | Lin | ......................... | H04B 15/00 |
| 2017/0250729 A1 | 8/2017 | Köse et al. | | |
| 2021/0119665 A1 | 4/2021 | Lee | | |

* cited by examiner

*Primary Examiner* — Tuan Pham
(74) *Attorney, Agent, or Firm* — Ashurst Perkins Coie US LLP

(57) ABSTRACT

Methods, systems and devices for interference characterization and excision are described. An example method for wireless communication includes receiving, via an analog prefilter in a first frequency band, a first analog signal comprising a signal-of-interest and an interfering signal, receiving, via the analog prefilter, in an additional frequency band, an additional analog signal, wherein the additional analog signal comprises the interfering signal, generating, based on the additional analog signal, an estimate of the interfering signal, digitizing the first analog signal to generate a first digital signal, canceling the estimate of the interfering signal from the first digital signal to generate an estimate of the signal-of-interest, and demodulating the estimate of the signal-of-interest to generate estimated data symbols.

20 Claims, 10 Drawing Sheets

ADJACENT-CHANNEL INTERFERENCE CHARACTERIZATION FOR IN-BAND INTERFERENCE EXCISION IN WIRELESS COMMUNICATION SYSTEMS

CROSS-REFERENCE TO RELATED APPLICATION

This application is a 371 U.S. National Stage application of International Application No. PCT/US2023/012138, filed Feb. 1, 2023, which claims priority to U.S. Provisional Application 63/305,472 filed on Feb. 1, 2022, the disclosure of which are hereby incorporated by reference herein in their entireties.

TECHNICAL FIELD

This document generally relates to wireless networks, and more specifically, to interference cancellation in wireless networks.

BACKGROUND

Due to ever-increasing user density and the demand for ubiquitous connectivity, radio frequency (RF) interference is a growing concern for wireless applications. Wireless systems are configured to mitigate RF interference either by avoidance or active excision. RF interference mitigation through avoidance relies on careful planning or dynamic reconfiguration. On the other hand, RF interference mitigation via active excision employs signal processing to cancel the in-band interference.

SUMMARY

Embodiments of the disclosed technology are directed to in-band interference excision based on characterizing interference in adjacent channels. In an example, interference signals received in RF channels adjacent to a center channel containing the signal-of-interest are received, sampled, and processed to generate an estimate of the interference. The estimate of the interference is used to mitigate the interference in the center channel, which enables determining an interference-canceled signal-of-interest.

In an example aspect, a method of wireless communication includes receiving, via an analog prefilter in a first frequency band, a first analog signal comprising a signal-of-interest and an interfering signal, receiving, via the analog prefilter, in an additional frequency band, an additional analog signal, wherein the additional analog signal comprises the interfering signal, generating, based on the additional analog signal, an estimate of the interfering signal, digitizing the first analog signal to generate a first digital signal, canceling the estimate of the interfering signal from the first digital signal to generate an estimate of the signal-of-interest, and demodulating the estimate of the signal-of-interest to generate data symbols, wherein a bandwidth of the analog prefilter spans the first frequency band and the additional frequency band, and wherein a bandwidth of the signal-of-interest is less than or equal to a bandwidth of the first frequency band.

In another example aspect, a method of wireless communication includes receiving, over a bandwidth, a plurality of analog signals, wherein the bandwidth comprises (a) a center frequency band spanning $-f_C$ Hz to $f_C$ Hz, (b) a lower frequency band spanning $-f_L$ Hz to $-f_C$ Hz, and (c) an upper frequency band spanning $f_C$ Hz to $f_U$ Hz, wherein the plurality of analog signals in the center frequency band comprises a signal-of-interest and an interfering signal, wherein the plurality of analog signals in the lower frequency band and the upper frequency band comprises the interfering signal, and wherein a bandwidth of the signal-of-interest is contained within $-f_C$ Hz to $f_C$ Hz, generating, based on the plurality of analog signals in the lower frequency band and the upper frequency band, an estimate of the interfering signal, and canceling the estimate of the interfering signal from the plurality of analog signals in the center frequency band to generate an estimate of the signal-of-interest.

In yet another example aspect, a method of wireless communication includes during a training period: receiving, in one or more adjacent channels that are partially overlapping or non-overlapping with a center channel, the interfering signal, and determining, based on the receiving, an estimate of the interfering signal, and during an excision period: receiving, in the center channel, an analog signal comprising a signal-of-interest and the interfering signal, digitizing the analog signal to generate a digital signal, and canceling the estimate of the interfering signal from the digital signal to generate an estimate of the signal-of-interest.

In yet another example, the above-described method is embodied in the form of processor-executable code and stored in a computer-readable program medium.

In yet another example, a device that is configured or operable to perform the above-described method is disclosed.

The above examples and other aspects and their implementations are described in greater detail in the drawings, the descriptions, and the claims.

DETAILED DESCRIPTION

Radio frequency (RF) interference is a principal concern for wireless applications due to the ever-increasing user density and the demand for ubiquitous connectivity. Today, wireless systems mitigate RF interference by (i) avoidance (through careful planning or dynamic reconfiguration), or (ii) active excision (through signal processing). The described embodiments belong to the latter category and use interference characterization based on channels adjacent to a center channel to perform interference excision on signal received in the center channel.

In existing implementations, a wireless receiver incorporates a series of analog (RF and baseband/IF) filtering stages configured to (i) allow the set of frequencies ("channel") of a signal-of-interest (SOI) (e.g., a radio communications signal, radar-return signal, or a beacon), and (ii) reject other, nearby set of frequencies ("adjacent channels"). Receiver front-end filtering limits adjacent-channel interference, but is ineffective against "co-channel interference", i.e., interference in the SOI channel. Strict rejection of adjacent channels, however, limits the observability of interference, which may be correlated across a wide band of frequencies that contains the desired SOI channel.

Figure 1:
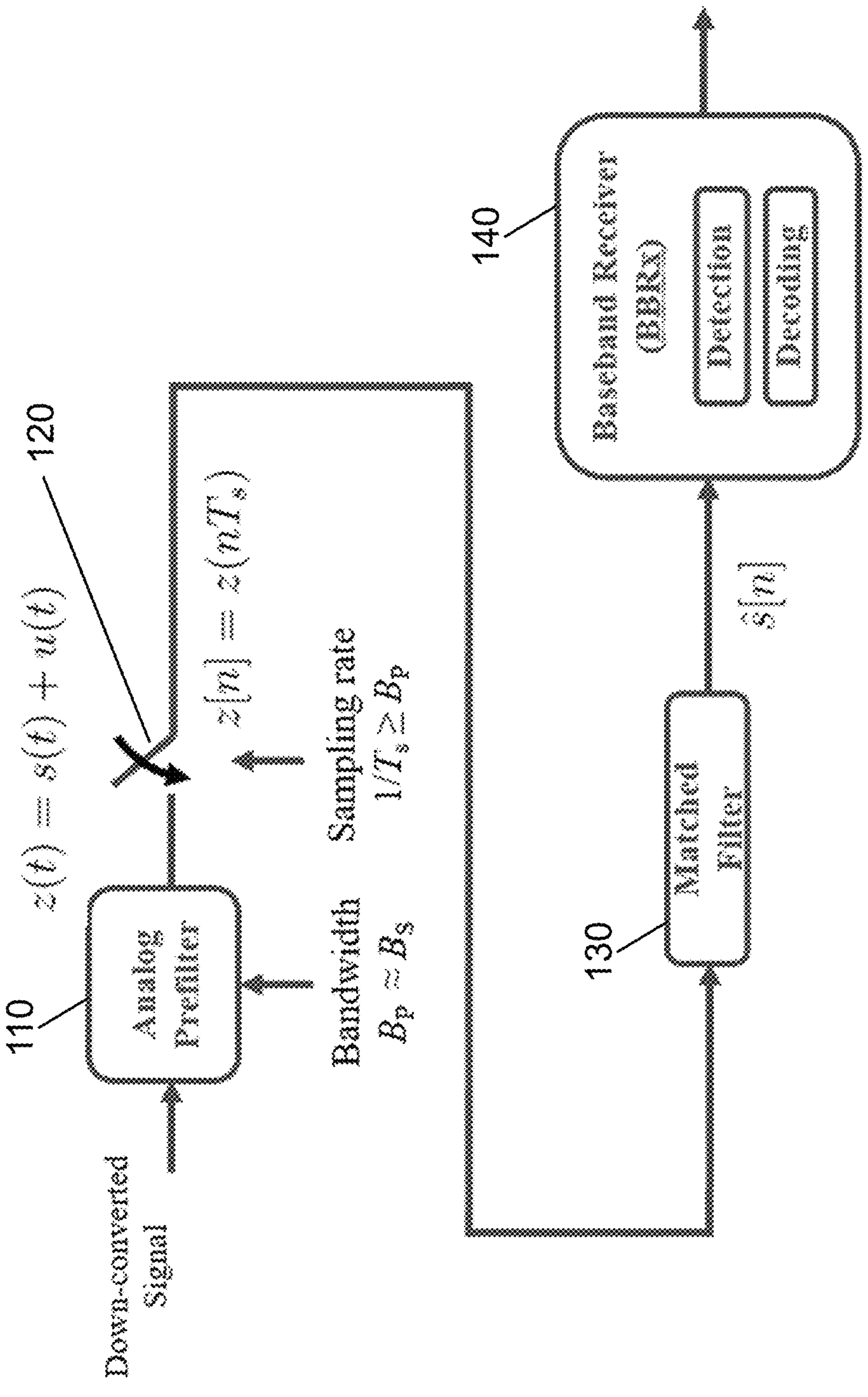
FIG. 1 shows an example of baseband receiver processing, in accordance with the disclosed technology.

FIG. 1 shows an example of baseband receiver processing. As shown therein, a down-converted signal-of-interest (SOI) is filtered using analog prefilter 110 with a prefilter bandwidth of $B_P$ Hz. The analog prefilter is configured to be wide enough to cover the center (C) channel that covers the signal bandwidth of $B_{SOI}$ Hz. In an example, $B_{SOI}=B_P=1$ MHz. The filtered signal is then processed by an analog-to-digital converter (ADC) 120 that samples the analog signal to generate a digital signal. The ADC is configured to operate at sampling rate that is greater than the Nyquist rate, e.g., $1/T_s \geq B_P$ Hz. The sampled signal is filtered using a matched filter 130 that is matched to the signal bandwidth, e.g., a "matched filter" that is routinely used in all digital receivers. The baseband receiver 140 performs synchronization (SYNC)-detection (e.g., net/burst/packet level) and decoding. The system shown in FIG. 1 is not configured to implement any form of interference characterization and/or excision.

Figure 2:
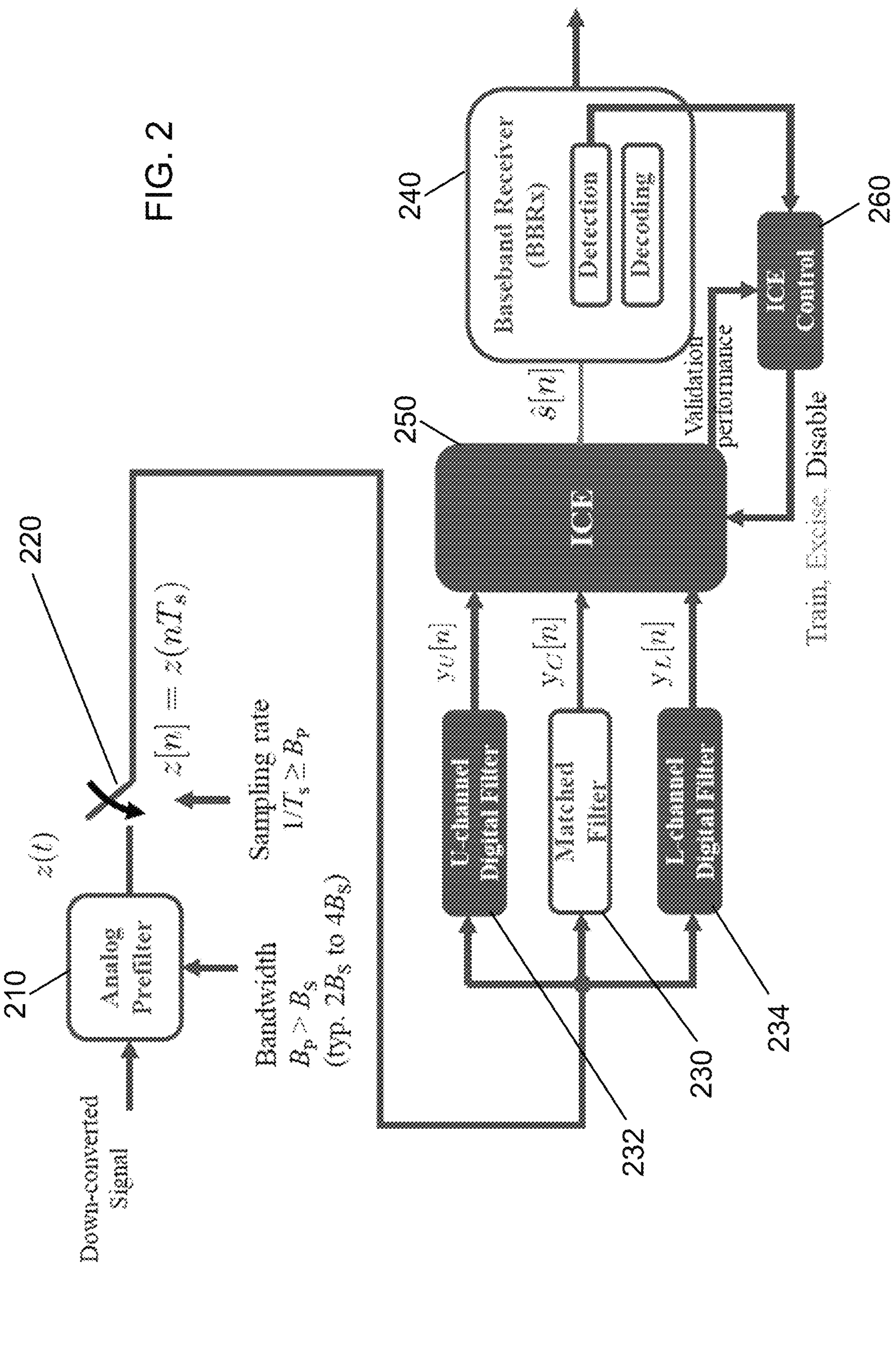
FIG. 2 shows an example of receiver processing in an interference characterization and excision (ICE) system, in accordance with the disclosed technology.

FIG. 2 shows an example of an interference characterization and excision system, in accordance with the presently disclosed technology. This example includes some features and/or components that are similar to those shown in FIG. 1 and described above. At least some of these features and/or components may not be separately described in this section. As shown in FIG. 2, the down-converted signal is processed by an analog prefilter 210 with a prefilter bandwidth of $B_P$ Hz. In this example, the analog prefilter is configured to be wide enough to cover the center (C) channel covering the signal bandwidth ($B_{SOI}$) plus an upper (U) adjacent channel and/or a lower (L) adjacent channel. In an example, $B_{SOI}=1$ MHz and the prefilter bandwidth is $B_P=3$ MHz. The ADC is configured to operate at sampling rate that is greater than the Nyquist rate, e.g., $1/T_s \geq B_P$ Hz.

The sampled signal (denoted z[n]) is filtered using a matched filter 230, a U-channel digital filter 232, and a L-channel digital filter 234. The matched filter 230 is matched to the signal bandwidth, e.g., a "matched filter" that is routinely used in all digital receivers, and the U-channel digital filter 232 and L-channel digital filter 234 cover the upper and lower adjacent channels, respectively. In an example, one or both of the U-channel digital filter 232 and the L-channel digital filter 234 has a frequency overlap with the C-channel digital filter 230. In another example, one or both of the U-channel digital filter 232 and the L-channel digital filter 234 is configured such that its 3-dB point intersects with the 3-dB point of the C-channel digital filter 230. In yet another example, the U-channel digital filter 232 and the L-channel digital filter 234 are configured such that there is no overlap (e.g., −20 dB or more) between the channel filters.

Figure 3:
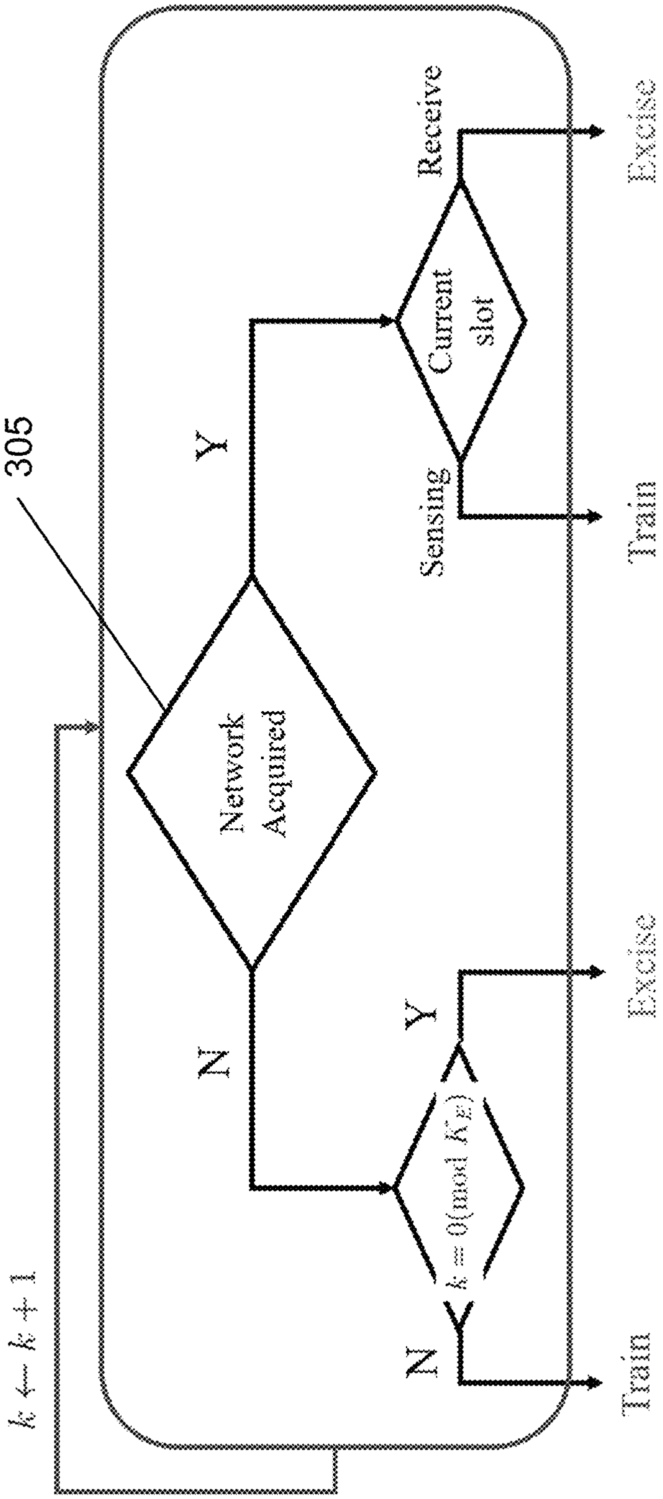
FIG. 3 shows an example of control logic for interference characterization and excision, in accordance with the disclosed technology.
Figure 4A:
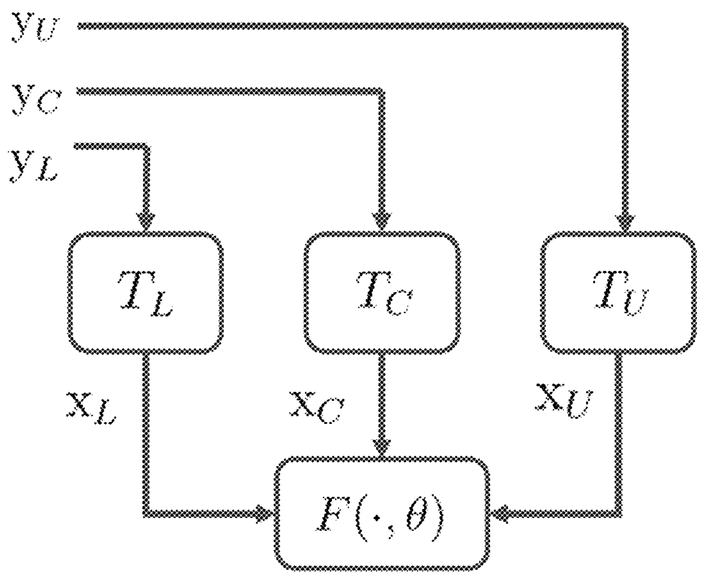
FIGS. 4A and 4B show examples of processing architectures for training and excision, respectively, in an ICE system, in accordance with the disclosed technology.
Figure 4B:
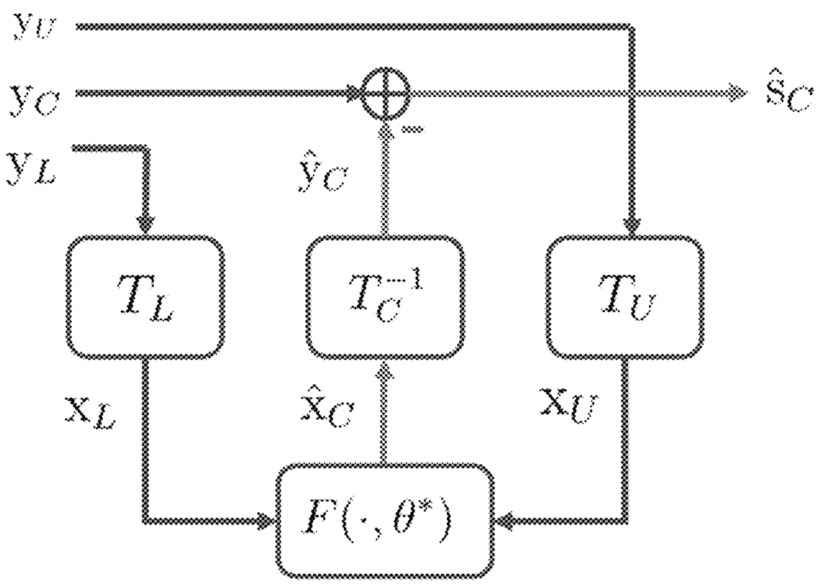

The outputs of the C-channel, U-channel, and L-channel digital filters (denoted $y_C[n]$, $y_U[n]$, and $y_L[n]$, respectively) are inputs to the interference characterization and excision (ICE) module 250, which is configured to operate in training and excision modes, which are detailed in the context of FIGS. 4A and 4B, respectively. In the training mode, the ICE module 250 learns to map (U)-channel observables and (L)-channel observables to (C)-channel observables, whereas in the excision mode, the ICE module 250 estimates (C)-channel interference from (U)- and (L)-channel observables and excises it. The baseband receiver 240 performs synchronization (SYNC)-detection (e.g., net/burst/packet level) and decoding of the interference-excised signal. The operation of the ICE module 250 is determined using the ICE control module 260, which configures the ICE module 250 to be in a training mode, an excision mode, or disabled. In an example, the mode of operation is selected based on the sync-detect indicator from the baseband receiver 240. The operation of the ICE module 250 is detailed in the context of FIG. 3.

As discussed in the context of FIG. 2, the embodiments described in this document prescribe a configuration of receiver filtering stages to allow adjacent-channel observables (thereby passing more noise and interference) which are then used to estimate the co-channel (or center-channel) interference and subsequently excise it. In some examples, the receive filtering stages may be specifically configured to observe the adjacent channel. In other examples, existing configurations of receiver filters may already provide sufficient observability of adjacent-channel interference because analog filters typically do not have sharp spectral transition.

The described methods rely on digitizing such adjacent-channel observables, in conjunction with appropriate digital filtering, and include two stages for interference mitigation:

(1) Interference characterization, learning the mapping from digitized adjacent-channel observables to existing digitized observables from the desired channel when a SOI is deemed to be not present or weak in comparison to ambient interference; and (2) Interference excision, applying the learned mapping to estimate co-channel interference and subtract it from original co-channel observables.

FIG. 3 shows an example of the control logic implemented in the ICE control module (e.g., ICE control module 260 in FIG. 2) in a time-division multiple access (TDMA) network, where k is the index of an epoch (a finite duration of RF observation) and $K_E$ is the recurrence of the excision epochs when radio is trying to acquire a network. A radio receiver can be experiencing heavy interference, and thereby not acquiring a network. As shown in FIG. 3, when a network is not acquired ("N" at 305), the ICE module alternates between training and excision, with an excision recurrence that is defined by $K_E$. Once the network is acquired ("Y" at 305), the radio is aware of the slot schedule of the TDMA network and is configured to always train on sensing slots and excise on receive slots. In some embodiments, the ICE control module can be configured to perform excision contingent on training performance (not shown in FIG. 3). For example, if excision is successful (e.g., sync detected, slot decoded), training is reinforced by using the estimated interference for a subsequent training stage.

FIGS. 4A and 4B show examples of processing architectures for the training stage and excision stage, respectively, in an ICE system. In the example training architecture shown in FIG. 4A, the following terminology is used:

$y_L$ ($y_U$) are $N_L$ ($N_U$) dimensional L-channel (U-channel) observables, which include both interference and noise.

$T_L$ ($T_U$) is a transformation of the L-vector (U-vector). In an example, the transformation is an identity transform, a short-term Fourier transform (STFT), a discrete Fourier transform (DFT), an autocorrelation function, a quadratic form, and the like.

$x_L$ ($x_U$) are $M_L$ ($M_U$) dimensional transformed L-channel (U-channel) observables.

$y_C$ are $N_C$ dimensional C-channel observables, e.g., interference+noise.

$T_C$ is a transformation of the C-vector (U-vector) and must be an invertible function. In an example, the transformation is an identity transform, a discrete Fourier transform (DFT), and the like.

$x_C$ are $M_C$=$N_C$ dimensional transformed C-channel observables.

F (·, 0) is a parametric mapping that maps ($M_L$+$M_U$) dimensional transformed L-channel and C-channel observables to $M_C$ dimensional transformed C-channel observables. In an example, the parametric mapping is a linear combiner, a nonlinear combiner, an artificial neural network (ANN), a vector quantization (VQ)-based nonlinear estimator (e.g., as described in FIGS. 5A-5C).

As shown in FIG. 4A, the channel observables are transformed using their respective transformations, and then input to the parametric mapping that computes:

$$\theta^* = \underset{\theta}{\operatorname{argmin}} \mathbb{E}\|\hat{y}_C(\theta) - y_C\|^2$$

$$\hat{y}_C(\theta) = T_C^{-1}\underbrace{F([x_L, x_U], \theta)}_{\hat{x}_C(\theta))}.$$

Herein, θ' are the parameters computed during the training phase, $\hat{y}_C$ are estimates of the $N_C$ dimensional C-channel interference, $$T_C^{-1}$$

is the inverse of transformation $T_C$, and $\hat{x}_C$ are $M_C$=$N_C$ dimensional estimate of transformed C-channel observables. In the training mode, the ICE module (e.g., ICE module 250 in FIG. 2) computes an estimate of the interference based on the transformed observables, $x_U$ and $x_L$, in the U-channel and the L-channel, respectively.

In the example excision architecture shown in FIG. 4B, $y_C$ are $N_C$ dimensional C-channel observables, e.g., interference+SOI+receiver noise, and $\hat{s}_C$ is the interference canceled signal. As shown in FIG. 4B, $\hat{x}_C$, which is the $M_C$=$N_C$ dimensional estimate of transformed C-channel observables, is inverse transformed to generate $\hat{y}_C$, which is the estimate of the $N_C$ dimensional C-channel interference, and subtracted from the received C-channel observables to generate the interference canceled signal, which is represented as:

$$\hat{s}_C = y_C - \hat{y}_C(\theta^*)$$

$$\hat{y}_C(\theta^*) = T_C^{-1}\underbrace{F([x_L, x_U], \theta^*)}_{\hat{x}_C(\theta^*)}$$

Figure 5A:
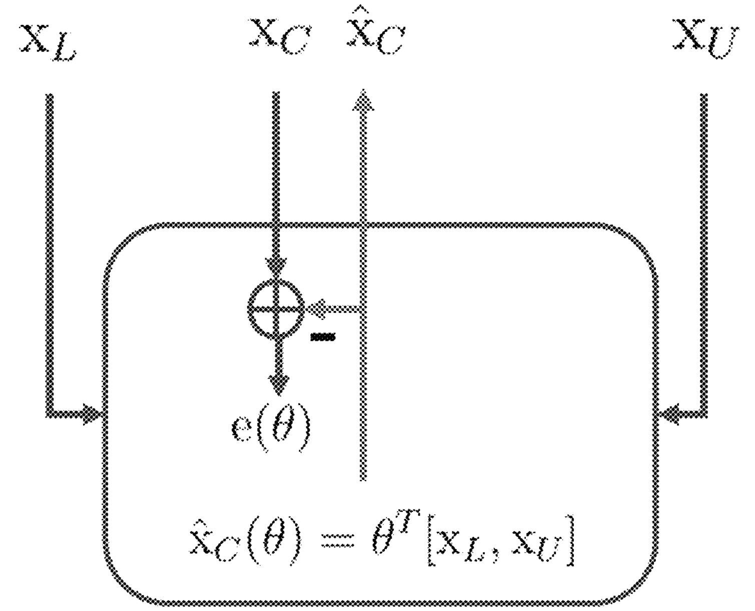
FIGS. 5A-5C show examples of parametric mappers used in an ICE system, in accordance with the disclosed technology
Figure 5B:
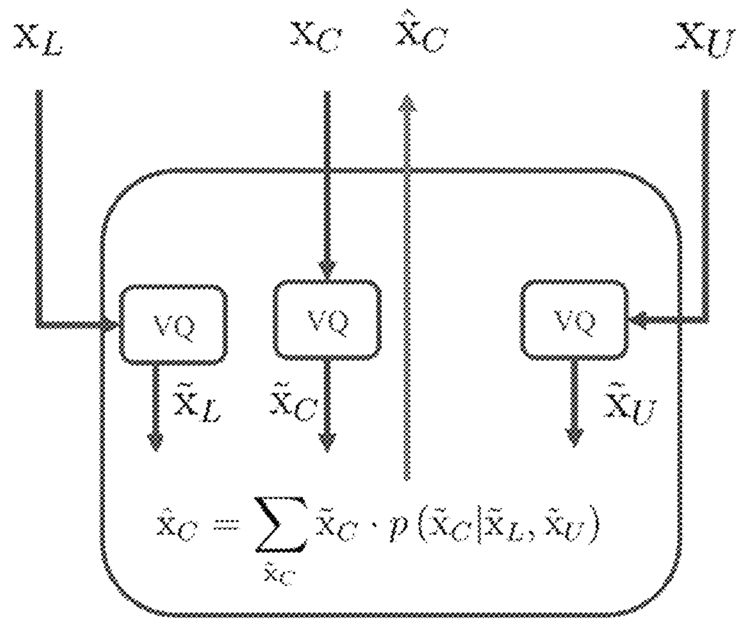
Figure 5C:
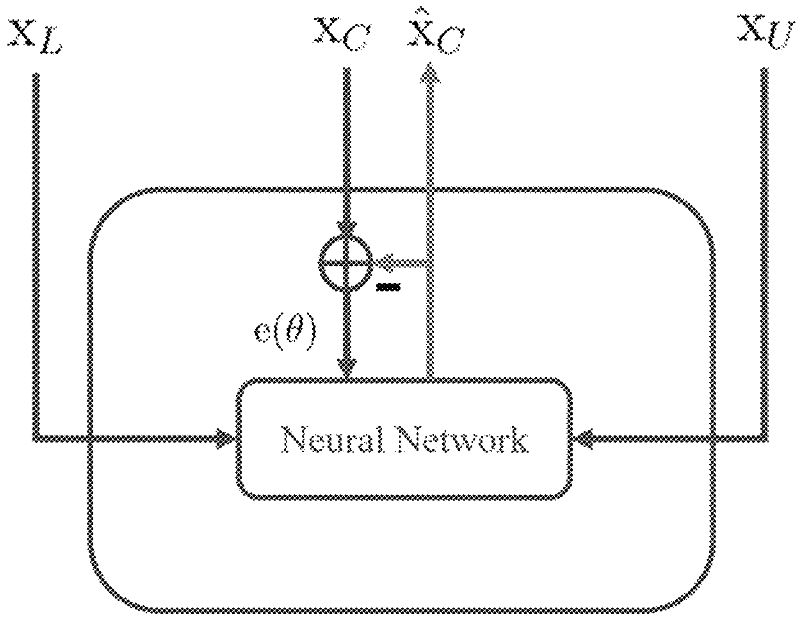

FIGS. 5A-5C show examples of parametric mappers that maps ($M_L$+$M_U$) dimensional transformed L-channel and U-channel observables to $M_C$ dimensional transformed C-channel observables. These examples include some features and/or terminology that are similar to those shown in FIGS. 4A and 4B as described above. At least some of these features and/or terminology may not be separately described in this section.

FIG. 5A shows an example of the parametric mapper implemented using a linear combiner, wherein the parameter set is the combining weights for the transformed L- and U-channel observables. In the training mode, the linear combiner formulates a least squares (LS) solution and minimizes the error between the transformed C-channel observables and its estimate. In an example, either batch or recursive frameworks are implemented over epochs. In another example, the linear combiner can employ a least mean squares (LMS) algorithm or a recursive least squares (RLS) algorithm.

In some embodiments, the parameters computed during the training phase for the linear combiner shown in FIG. 5A are derived as:

$$\theta^* = \underset{\theta}{\operatorname{argmin}} \frac{1}{K}\sum_k \left|T_C^{-1} e^{(k)}(\theta)\right|^2$$

Herein, k is the index of training epoch.

FIG. 5B shows an example of the parametric mapper implemented using a vector quantization (VQ)-based nonlinear estimator, where all the observables (L-, U- and C-) are vector-quantized over epochs. In an example, vector-quantizing the observables over epochs is implemented using principal component analysis (PCA), K-means clustering, and the like. In the training mode, the VQ-based nonlinear estimator determines the parameter space, which includes the VQ codebook and the conditional probability distribution of vector-quantized C-channel transformed observables given the vector-quantized U-channel transformed observables and the vector-quantized L-channel transformed observables that are collected. As shown in FIG. 5B, the empirical minimum mean square error (MMSE) solution ($\hat{x}_C$) is available analytically.

FIG. 5C shows an example of the parametric mapper implemented using an artificial neural network (ANN), where the transformed L-channel observables and the transformed U-channel observables are inputs to the ANN, e.g., a multi-layer perceptron (MLP). The parameter set is the weights of the network. In the training mode, the transformed C-channel observables are treated as the "label," the weights of the network are updated (e.g., using stochastic gradient descent (SGD)) to minimize a squared loss function with the inverse C-channel transformation.

In some embodiments, the parameters computed during the training phase for nonlinear neural network shown in FIG. 5C are derived as:

$$\theta^* = \underset{\theta}{\operatorname{argmin}} \frac{1}{K}\sum_k \left|T_C^{-1} e^{(k)}(\theta)\right|^2$$

Herein, k is the index of training epoch.

Embodiments of the disclosed technology are especially effective, among other types of interference, against (i) co-site interference, caused by a nearby, adjacent-channel RF emitter (radio communications, radar or friendly jammer), facilitating frequency planning and increasing spectral re-use, and (ii) broadband jamming (friendly/adversarial) interference, e.g., due to swept/hopped tones, improving link reliability.

Figure 6A:
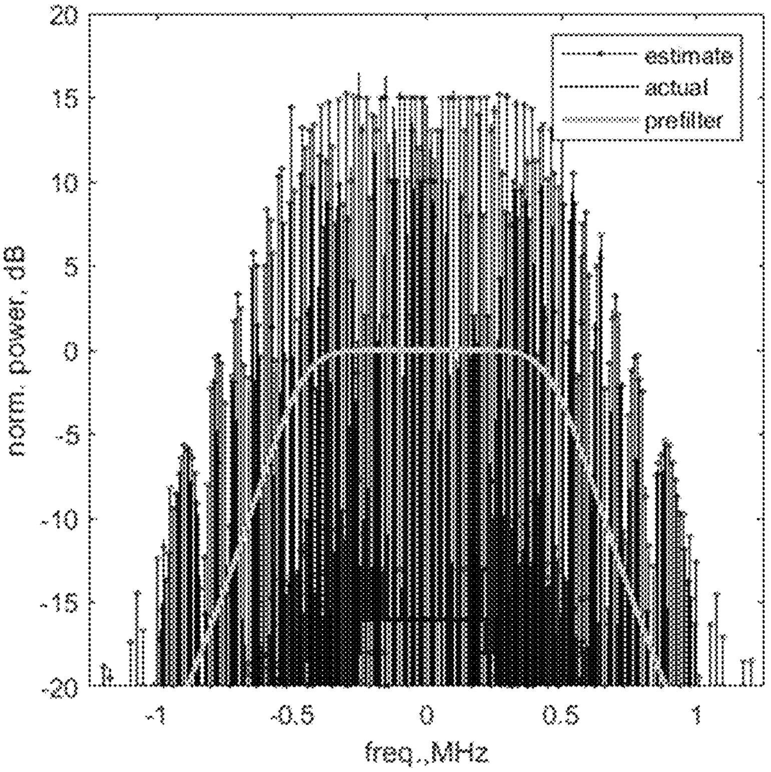
FIGS. 6A and 6B show example simulation results that illustrate the efficacy of embodiments of the disclosed technology.
Figure 6B:
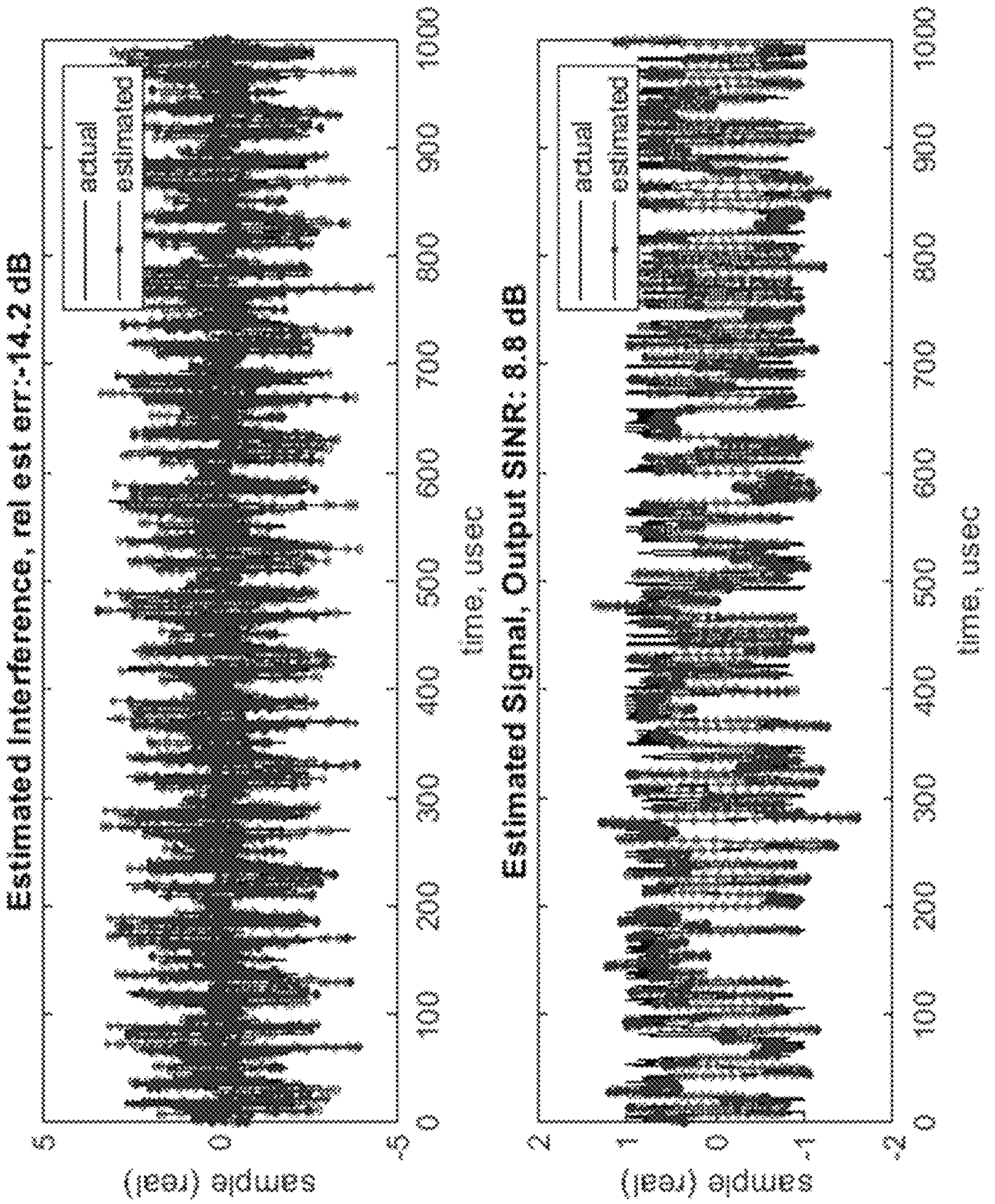

The efficacy of the disclosed technology is shown in FIGS. 6A and 6B, which illustrate an example of the frequency domain response (in FIG. 6A) and examples of the time-series for the estimated interference (upper plot in FIG. 6B) and the estimated signal compared to the true signal (lower plot in FIG. 6B). The simulation results shown in FIGS. 6A and 6B were generated for the following scenario:

- the signal-of-interest (SOI) is a Gaussian minimum shift keying (GMSK) signal with an RF bandwidth of 0.5 MHz and an SNR of 10 dB without interference
- the interference includes:
  - Swept-tone #1: −1 MHz to +1 MHz, 0.1 msec sweep period, interference-to-signal power ratio is ISR=10 dB
  - Swept-tone #2: −2 MHz to +2 MHz, 0.03 msec sweep period, interference-to-signal power ratio is ISR=8 dB
- the analog prefilter is a 4th-order Butterworth filter with $B_P$=1 MHZ
- the ADC operates at a sample rate of $1/T_s$=2 MHZ
- the digital filters are configured as:
  - C-channel ("matched") filter: $B_C$=0.6 MHz, at band center
  - L-channel filter: $B_L$=0.6 MHz, offset by +0.2 MHz from band center
  - U-channel filter: $B_U$=0.6 MHz, offset by −0.2 MHz from band center
- an epoch duration of 32 μsec
- each of $T_U$, $T_L$, and $T_C$ is a 64-point discrete Fourier transform (DFT)
- the parametric mapping is a multi-layer perceptron (MLP) with 128 complex inputs, 3 hidden layers of (256, 512, 256), and 128 complex outputs As shown in FIG. 6B, the relative estimation error is-14.2 dB and the output signal-to-interference plus noise ratio (SINR) of the estimated signal is 8.8 dB (with the original SOI having an SNR of 10 dB without interference), thereby demonstrating the efficacy of the described embodiments.

Figure 7:
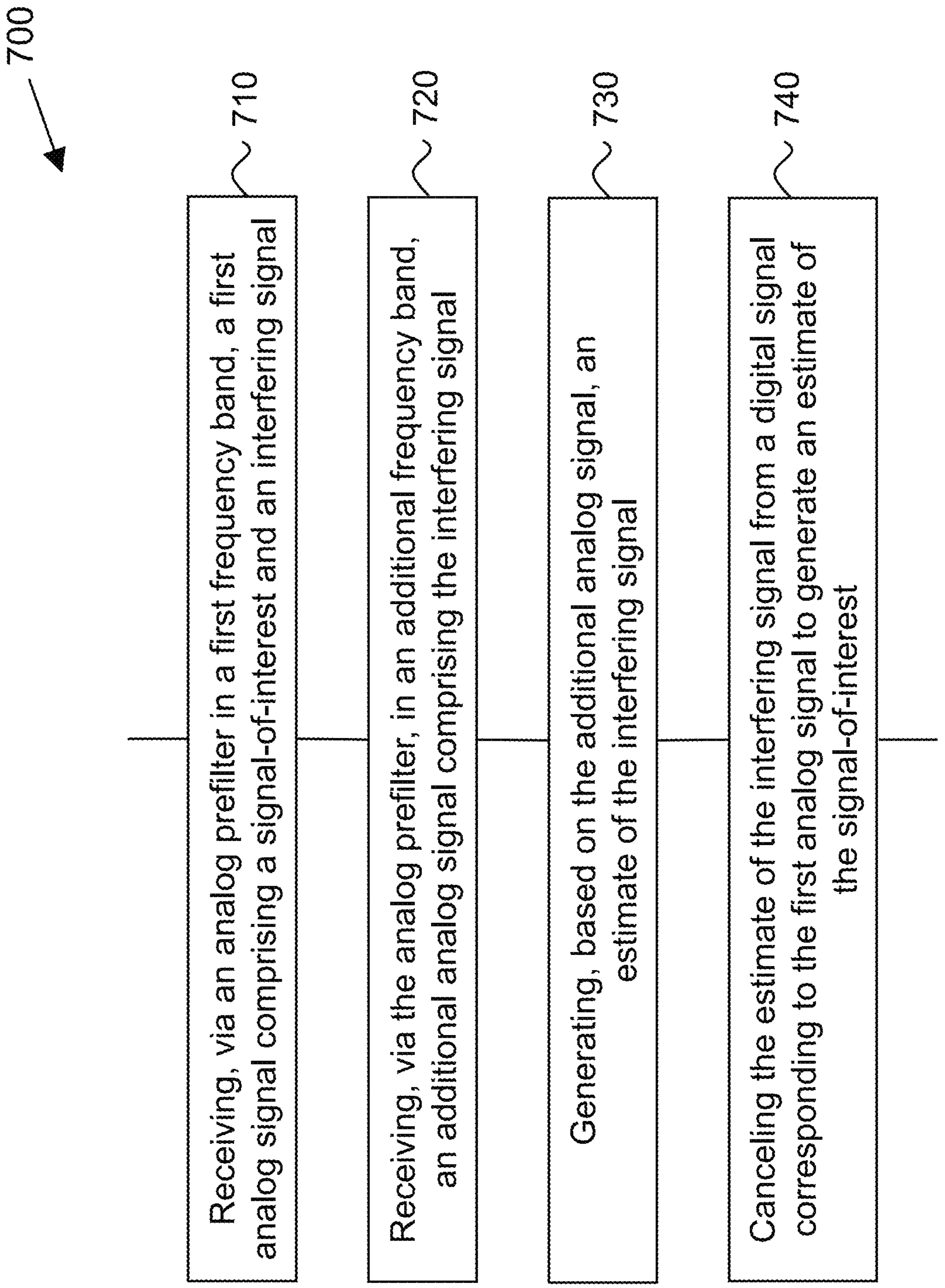
FIGS. 7 and 8 are flowcharts of example methods of interference characterization and excision, in accordance with the disclosed technology.

FIG. 7 is a flowchart of an example method 700 for interference characterization and excision. The method 700 includes, at operation 710, receiving, via an analog prefilter in a first frequency band, a first analog signal comprising a signal-of-interest and an interfering signal. In this document, the term "frequency band," e.g., f1 to f2, is used to denote the set of contiguous frequencies in a bandwidth from the first frequency (f1) to the second frequency (f2).

The method 700 includes, at operation 720, receiving, via the analog prefilter, in an additional frequency band, an additional analog signal comprising the interfering signal. In some examples, the additional frequency band is adjacent to, but non-overlapping with, the first frequency band. In other examples, the additional frequency band is adjacent to, and partially overlapping with, the first frequency band. In some embodiments, a bandwidth of the analog prefilter spans the first frequency band and the additional frequency band, and a bandwidth of the signal-of-interest is less than or equal to a bandwidth of the first frequency band.

The method 700 includes, at operation 730, generating, based on the additional analog signal, an estimate of the interfering signal.

The method 700 includes, at operation 740, canceling the estimate of the interfering signal from a digital signal corresponding to the first analog signal to generate an estimate of the signal-of-interest.

In some embodiments, the estimate of the interfering signal comprises the estimate of the interfering signal in the first frequency band. In an example, the interfering signal estimate determined using the upper and lower channels can be used directly for excision in the center channel. In another example, the interfering signal estimate determined using the upper and lower channels must be transformed (e.g., based on the frequency dependency between upper, center, and lower channels) prior to being used for excision in the center channel.

In some embodiments, the method 700 further includes the operation of digitizing the first analog signal to generate the digital signal corresponding to the first analog signal.

In some embodiments, the method 700 further includes the operation of demodulating the estimate of the signal-of-interest to generate data symbols.

In some embodiments, the generating the estimate of the interfering signal comprises digitizing the additional analog signal to generate an additional digital signal, and generating, based on the additional digital signal, the estimate of the interfering signal using a parametric estimator.

In some embodiments, the parametric estimator comprises at least one of a linear estimator, a vector quantization (VQ)-based nonlinear estimator, or an artificial neural network (e.g., as described in FIGS. 5A-5C, respectively). In an example, the linear estimator uses a least mean squares (LMS) algorithm or a recursive least squares (RLS) algorithm. In another example, the VQ-based nonlinear estimator uses K-means clustering, principal component analysis (PCA), or a similar unsupervised machine learning algorithm.

In some embodiments, the additional frequency band comprises a second frequency band and the additional analog signal comprises a second analog signal. In an example, a center frequency of the second frequency band is greater than a center frequency of the first frequency band (e.g., the upper channel in FIG. 1 is used). In another example, a center frequency of the second frequency band is less than a center frequency of the first frequency band (e.g., the lower channel in FIG. 1 is used). In yet another example, the additional frequency band comprises a second frequency band and a third frequency band, the additional analog signal comprises a second analog signal and a third analog signal, and a center frequency of the second frequency band is less than a center frequency of the first frequency band and a center frequency of the third frequency band is greater than the center frequency of the first frequency band (e.g., both the upper and lower channels in FIG. 1 are used).

In some embodiments, the wireless network is a time-division multiple access (TDMA) network, and a plurality of timeslots of the TDMA network comprise scheduled sensing slots and scheduled receiving slots, as described in the context of FIG. 3.

In some embodiments, the wireless apparatus operates in a training mode in at least one of the scheduled sensing slots, and the method 700 further includes the operations of receiving, during the training mode and prior to receiving first analog signal, the interfering signal in the additional frequency band, and generating, based on the interfering signal received during the training mode, an initial estimate of the interfering signal, wherein the estimate of the interfering signal is based on the initial the estimate of the interfering signal. In an example, the "training" is performed prior to the "excision."

In some embodiments, the signal-of-interest is a frequency-localized signal.

In some embodiments, the signal-of-interest is a frequency-hopped signal. In an example, the bandwidth of the analog prefilter is greater than an instantaneous hop bandwidth of the frequency-hopped signal.

In some embodiments, the additional analog signal consists of the interfering signal, e.g., only the interfering signal is received over the adjacent channel and no signal-of-interest is present in the upper and/or lower channels.

In some embodiments, the additional analog signal consists of the interfering signal and a noise signal, e.g., only the interfering signal and AWGN noise (or colored noise) is received over the adjacent channel and no SOI is present in the upper and/or lower channels.

Figure 8:
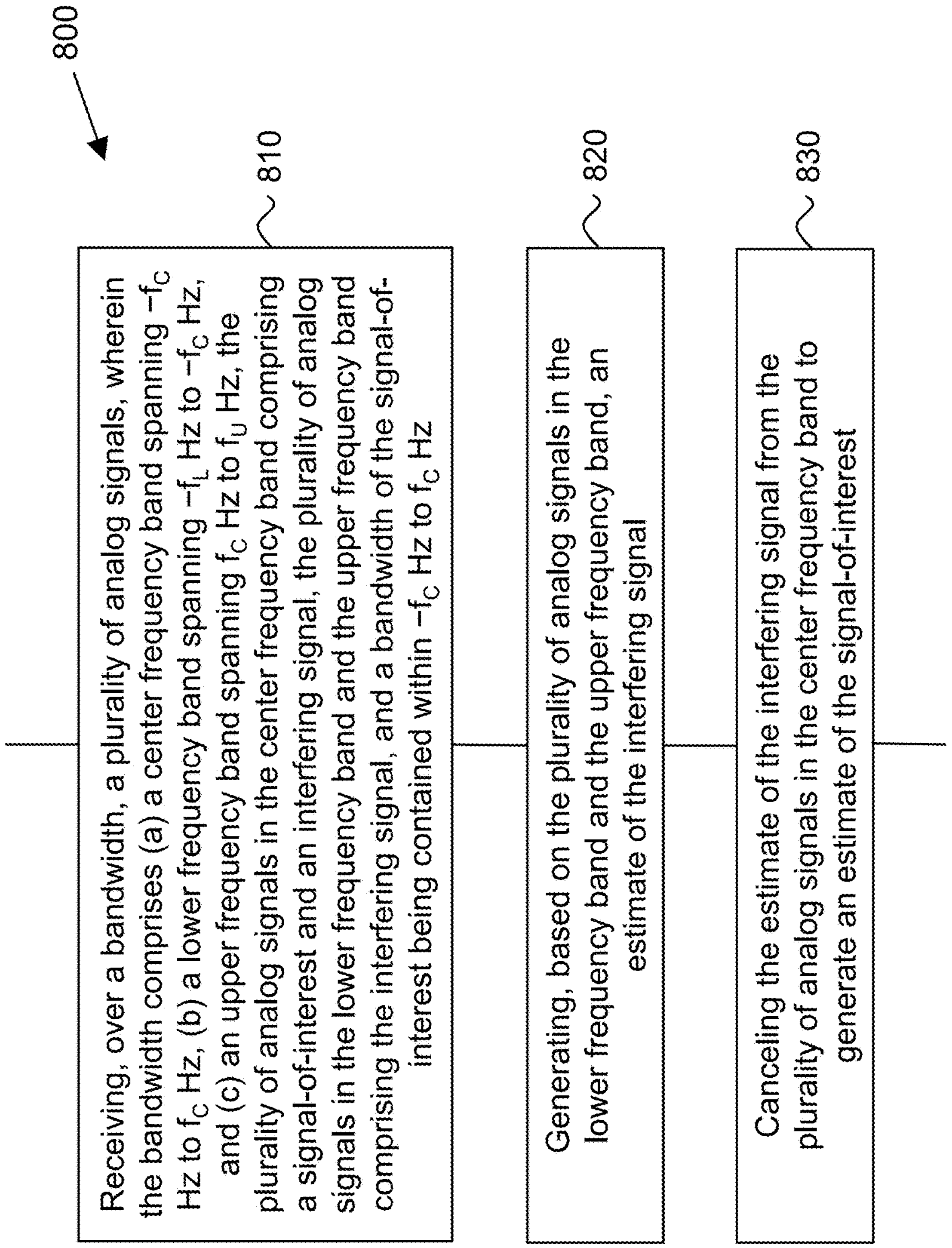

FIG. 8 is a flowchart of an example method 800 for interference characterization and excision. The method 800 includes, at operation 810, receiving, over a bandwidth, a plurality of analog signals, wherein the bandwidth comprises (a) a center frequency band spanning $-f_C$ Hz to $f_C$ Hz, (b) a lower frequency band spanning $-f_L$ Hz to $-f_C$ Hz, and (c) an upper frequency band spanning $f_C$ Hz to $f_U$ Hz, the plurality of analog signals in the center frequency band comprising a signal-of-interest and an interfering signal, the plurality of analog signals in the lower frequency band and the upper frequency band comprising the interfering signal, and a bandwidth of the signal-of-interest being contained within-$f_C$ Hz to $f_C$ Hz.

The method 800 includes, at operation 820, generating, based on the plurality of analog signals in the lower frequency band and the upper frequency band, an estimate of the interfering signal.

The method 800 includes, at operation 830, canceling the estimate of the interfering signal from the plurality of analog signals in the center frequency band to generate an estimate of the signal-of-interest.

The disclosed technology provides, inter alia, the following technical solutions:

1. A method of wireless communication, implemented at a wireless apparatus operating in a wireless network, the method comprising receiving, via an analog prefilter in a first frequency band, a first analog signal comprising a signal-of-interest and an interfering signal, receiving, via the analog prefilter, in an additional frequency band, an additional analog signal, wherein the additional analog signal comprises the interfering signal, generating, based on the additional analog signal, an estimate of the interfering signal, digitizing the first analog signal to generate a first digital signal, canceling the estimate of the interfering signal from the first digital signal to generate an estimate of the signal-of-interest, and demodulating the estimate of the signal-of-interest to generate data symbols, wherein a bandwidth of the analog prefilter spans the first frequency band and the additional frequency band, and wherein a bandwidth of the signal-of-interest is less than or equal to a bandwidth of the first frequency band.

2. The method of solution 1, wherein the estimate of the interfering signal comprises the estimate of the interfering signal in the first frequency band.

3. The method of solution 1 or 2, wherein the generating the estimate of the interfering signal comprises digitizing the additional analog signal to generate an additional digital signal, and generating, based on the additional digital signal, the estimate of the interfering signal using a parametric estimator.

4. The method of solution 3, wherein the parametric estimator comprises at least one of a linear estimator, a vector quantization (VQ)-based nonlinear estimator, or an artificial neural network (ANN).

5. The method of solution 4, wherein the linear estimator uses a least mean squares (LMS) algorithm or a recursive least squares (RLS) algorithm.

6. The method of solution 4, wherein the VQ-based nonlinear estimator uses K-means clustering or principal component analysis (PCA).

7. The method of any of solutions 1 to 6, wherein the additional frequency band comprises a second frequency band and the additional analog signal comprises a second analog signal.

8. The method of solution 7, wherein a center frequency of the second frequency band is greater than a center frequency of the first frequency band.

9. The method of solution 7, wherein a center frequency of the second frequency band is less than a center frequency of the first frequency band.

10. The method of any of solutions 1 to 6, wherein the additional frequency band comprises a second frequency band and a third frequency band, wherein the additional analog signal comprises a second analog signal and a third analog signal, and wherein a center frequency of the second frequency band is less than a center frequency of the first frequency band and a center frequency of the third frequency band is greater than the center frequency of the first frequency band.

11. The method of any of solutions 1 to 10, wherein the wireless network is a time-division multiple access (TDMA) network, and wherein a plurality of timeslots of the TDMA network comprise scheduled sensing slots and scheduled receiving slots.

12. The method of solution 11, wherein the wireless apparatus operates in a training mode in at least one of the scheduled sensing slots.

13. The method of solution 12, further comprising receiving, during the training mode and prior to receiving first analog signal, the interfering signal in the additional frequency band, and generating, based on the interfering signal received during the training mode, an initial estimate of the interfering signal, wherein the estimate of the interfering signal is based on the initial the estimate of the interfering signal.

14. The method of solution 11, wherein the wireless apparatus operates in an excision mode in at least one of the scheduled receiving slots.

15. The method of any of solutions 1 to 14, wherein the signal-of-interest is a frequency-localized signal.

16. The method of any of solutions 1 to 14, wherein the signal-of-interest is a frequency-hopped signal.

17. The method of solution 16, wherein the bandwidth of the analog prefilter is greater than an instantaneous hop bandwidth of the frequency-hopped signal.

18. The method of any of solutions 1 to 17, wherein the additional analog signal consists of the interfering signal.

19. The method of any of solutions 1 to 17, wherein the additional analog signal consists of the interfering signal and a noise signal.

20. A method of wireless communication, comprising receiving, over a bandwidth, a plurality of analog signals, wherein the bandwidth comprises (a) a center frequency band spanning $-f_C$ Hz to $f_C$ Hz, (b) a lower frequency band spanning $-f_L$ Hz to $-f_C$ Hz, and (c) an upper frequency band spanning $f_C$ Hz to $f_U$ Hz, wherein the plurality of analog signals in the center frequency band comprises a signal-of-interest and an interfering signal, wherein the plurality of analog signals in the lower frequency band and the upper frequency band comprises the interfering signal, and wherein a bandwidth of the signal-of-interest is contained within-$f_C$ Hz to $f_C$ Hz, generating, based on the plurality of analog signals in the lower frequency band and the upper frequency band, an estimate of the interfering signal, and canceling the estimate of the interfering signal from the plurality of analog signals in the center frequency band to generate an estimate of the signal-of-interest.

21. The method of solution 20, wherein the estimate of the interfering signal is generated based on a parametric estimator.

22. The method of solution 21, wherein the parametric estimator is an artificial neural network (ANN).

23. The method of solution 22, wherein an input to the ANN comprises a signal derived based on a transformation of the plurality of analog signals in the lower frequency band and the upper frequency band, and wherein a transformation of the plurality of analog signals in the center frequency band is used as a label during a training mode of the neural network.

24. A method of excising an interfering signal, comprising during a training period: receiving, in one or more adjacent channels that are partially overlapping or non-overlapping with a center channel, the interfering signal, and determining, based on the receiving, an estimate of the interfering signal, and during an excision period: receiving, in the center channel, an analog signal comprising a signal-of-interest and the interfering signal, digitizing the analog signal to generate a digital signal, and canceling the estimate of the interfering signal from the digital signal to generate an estimate of the signal-of-interest.

25. The method of solution 24, wherein the interfering signal is received in the center channel during the training period.

26. The method of any of solutions 1 to 25, wherein the interfering signal comprises a co-site adjacent-channel interfering signal.

27. The method of any of solutions 1 to 25, wherein the interfering signal comprises a broadband jamming interfering signal.

28. A data processing device comprising a processor configured to perform the method of any of solutions 1 to 27.

29. A computer program comprising instructions which, when the computer program is executed by a processor, cause the processor to carry out the method in any of solutions 1 to 27.

Figure 9:
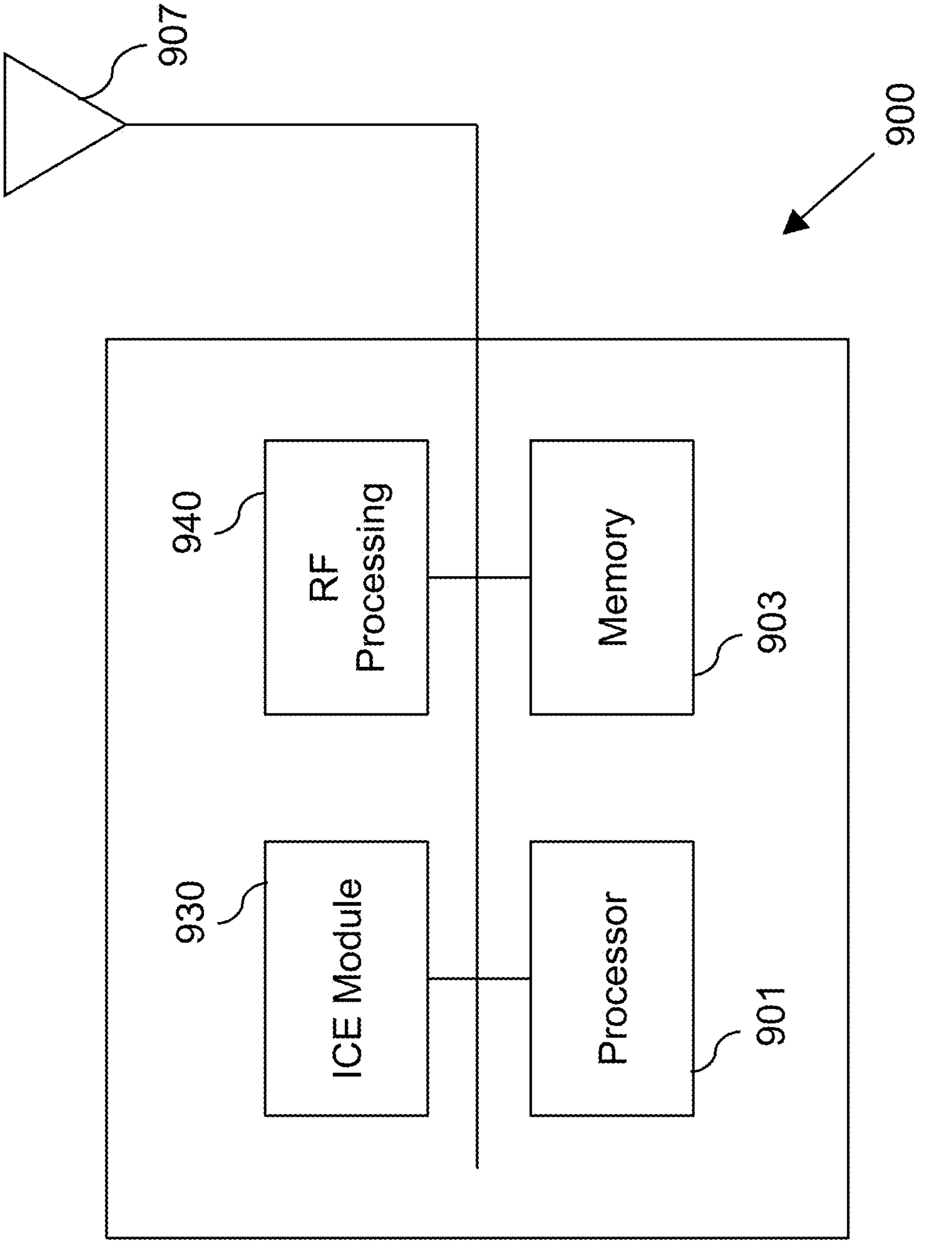
FIG. 9 is a block diagram representation of a portion of an apparatus that may implement a method or technique described in this patent document.

FIG. 9 is a block diagram representation of a portion of an apparatus, in accordance with some embodiments of the presently disclosed technology. An apparatus 900 can include a processor 901 (e.g., a microprocessor) that implements one or more of the techniques presented in this document (e.g., methods 700 and 800). Apparatus 900 can include one or more memories 903 communicatively coupled to the processor 901 and configured to store information such as data and/or instructions. The apparatus 900 can further include an interference characterization and excision (ICE) module 930 and RF processing 940 that is communicatively coupled to the processor 901 and the memory 903. In some embodiments, the RF processing 940 includes an analog prefilter (e.g., as shown in FIG. 2). In some embodiments, the apparatus 900 may be further configured to send and/or receive wireless signals over one or more communication interfaces such as antenna(s) 920. In some embodiments, the ICE module 930 may be partially or entirely implemented in the processor 901. In some embodiments, at least some of the disclosed techniques, modules or functions are implemented using the apparatus 900.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media suitable for storing computer program instructions and data include all forms of nonvolatile memory, media and memory devices, including, by way of example, semiconductor memory devices, e.g., EPROM, EEPROM, and flash memory devices. The processor and memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, implemented at a wireless apparatus operating in a time-division multiple access (TDMA) network, the method comprising:

receiving, via an analog prefilter in a first frequency band, a first analog signal comprising a signal-of-interest and an interfering signal;

receiving, via the analog prefilter, in an additional frequency band, an additional analog signal, wherein the additional analog signal comprises the interfering signal;

generating, based on the additional analog signal, an estimate of the interfering signal;

digitizing the first analog signal to generate a first digital signal;

canceling the estimate of the interfering signal from the first digital signal to generate an estimate of the signal-of-interest; and demodulating the estimate of the signal-of-interest to generate data symbols, wherein a bandwidth of the analog prefilter spans the first frequency band and the additional frequency band, and wherein a bandwidth of the signal-of-interest is less than or equal to a bandwidth of the first frequency band.

2. The method of claim 1, wherein the estimate of the interfering signal comprises the estimate of the interfering signal in the first frequency band.

3. The method of claim 1, wherein the generating the estimate of the interfering signal comprises:

digitizing the additional analog signal to generate an additional digital signal; and generating, based on the additional digital signal, the estimate of the interfering signal using a parametric estimator.

4. The method of claim 3, wherein the parametric estimator comprises at least one of a linear estimator, a vector quantization (VQ)-based nonlinear estimator, or an artificial neural network (ANN), wherein the linear estimator uses a least mean squares (LMS) algorithm or a recursive least squares (RLS) algorithm, and wherein the VQ-based nonlinear estimator uses K-means clustering or principal component analysis (PCA).

5. The method of claim 1, wherein the additional frequency band comprises a second frequency band and the additional analog signal comprises a second analog signal.

6. The method of claim 1, wherein the additional frequency band comprises a second frequency band and a third frequency band, wherein the additional analog signal comprises a second analog signal and a third analog signal, and wherein a center frequency of the second frequency band is less than a center frequency of the first frequency band and a center frequency of the third frequency band is greater than the center frequency of the first frequency band.

7. The method of claim 1, wherein a plurality of timeslots of the TDMA network comprise scheduled sensing slots and scheduled receiving slots.

8. The method of claim 7, wherein the wireless apparatus operates (a) in a training mode in at least one of the scheduled sensing slots, and (b) in an excision mode in at least one of the scheduled receiving slots.

9. The method of claim 8, further comprising:

receiving, during the training mode and prior to receiving first analog signal, the interfering signal in the additional frequency band; and generating, based on the interfering signal received during the training mode, an initial estimate of the interfering signal, wherein the estimate of the interfering signal is based on the initial estimate of the interfering signal.

10. The method of claim 1, wherein the signal-of-interest is a frequency-localized signal.

11. The method of claim 1, wherein the signal-of-interest is a frequency-hopped signal, and wherein the bandwidth of the analog prefilter is greater than an instantaneous hop bandwidth of the frequency-hopped signal.

12. The method of any of claim 1, wherein the additional analog signal consists of the interfering signal and/or a noise signal.

13. The method of claim 1, wherein the interfering signal comprises a co-site adjacent-channel interfering signal or a broadband jamming interfering signal.

14. A wireless apparatus for wireless communication, comprising:

a radio frequency (RF) processor configured to:

receive, via an analog prefilter in a first frequency band, a first analog signal comprising a signal-of-interest and an interfering signal, and receive, via the analog prefilter, in an additional frequency band, an additional analog signal, wherein the additional analog signal comprises the interfering signal; and one or more processors configured to:

generate, based on the additional analog signal, an estimate of the interfering signal, digitize the first analog signal to generate a first digital signal, cancel the estimate of the interfering signal from the first digital signal to generate an estimate of the signal-of-interest, and demodulate the estimate of the signal-of-interest to generate data symbols, wherein a bandwidth of the analog prefilter spans the first frequency band and the additional frequency band, and wherein a bandwidth of the signal-of-interest is less than or equal to a bandwidth of the first frequency band.

15. The wireless apparatus of claim 14, wherein the estimate of the interfering signal comprises the estimate of the interfering signal in the first frequency band.

16. The wireless apparatus of claim 14, wherein the one or more processors is configured, as part of generating the estimate of the interfering signal, to:

digitize the additional analog signal to generate an additional digital signal; and generate, based on the additional digital signal, the estimate of the interfering signal using a parametric estimator.

17. The wireless apparatus of claim 16, wherein the parametric estimator comprises at least one of a linear estimator, a vector quantization (VQ)-based nonlinear estimator, or an artificial neural network (ANN), wherein the linear estimator uses a least mean squares (LMS) algorithm or a recursive least squares (RLS) algorithm, and wherein the VQ-based nonlinear estimator uses K-means clustering or principal component analysis (PCA).

18. The wireless apparatus of claim 14, wherein the additional frequency band comprises a second frequency band and a third frequency band, wherein the additional analog signal comprises a second analog signal and a third analog signal, and wherein a center frequency of the second frequency band is less than a center frequency of the first frequency band and a center frequency of the third frequency band is greater than the center frequency of the first frequency band.

19. The wireless apparatus of claim 14, wherein the signal-of-interest is a frequency-localized signal.

20. The wireless apparatus of claim 14, wherein the signal-of-interest is a frequency-hopped signal, and wherein the bandwidth of the analog prefilter is greater than an instantaneous hop bandwidth of the frequency-hopped signal.

* * * * *